United States Patent [19]
Mullins

[11] Patent Number: 5,850,037
[45] Date of Patent: Dec. 15, 1998

[54] APPARATUS AND METHOD FOR LEAKAGE TESTING OF PRESSURIZED/SUCTION PIPING SYSTEMS

[76] Inventor: Colin B. Mullins, 518 Dove St., N. Augusta, S.C. 29841

[21] Appl. No.: 699,458

[22] Filed: Aug. 19, 1996

[51] Int. Cl.$^6$ ..................................................... G01M 3/28
[52] U.S. Cl. ........................................ 73/40.5 R; 73/49.1
[58] Field of Search ................................. 73/40.52, 49.1, 73/49.2, 49.3, 49.5

[56] References Cited

U.S. PATENT DOCUMENTS

| | | | |
|---|---|---|---|
| 1,196,828 | 9/1916 | Weatherson | 73/40.5 R |
| 2,353,275 | 7/1944 | St. Clair . | |
| 3,756,072 | 9/1973 | MacMurray . | |
| 3,910,102 | 10/1975 | McLean . | |
| 4,571,986 | 2/1986 | Fujii et al. | 73/49.1 |
| 4,590,793 | 5/1986 | Staats, Jr. | 73/40.5 R |
| 4,918,968 | 4/1990 | Hoffman . | |
| 5,415,033 | 5/1995 | Maresca, Jr., et al. | 73/40.5 R |

FOREIGN PATENT DOCUMENTS

| | | | |
|---|---|---|---|
| 2511268 | 9/1975 | Germany | 73/49.2 |

*Primary Examiner*—Daniel S. Larkin
*Attorney, Agent, or Firm*—Maria Reichmanis

[57] ABSTRACT

An apparatus and method for leakage testing of a pressurized/suction piping system. The apparatus includes a pump assembly for pressurizing the test system formed by the apparatus and the piping system, a pressure source connected to at least one input line assembly, an input line for supplying test fluid to the apparatus, an output line for discharging test fluid, and suitable adapters for connecting the input line assembly to the pipes being tested. In use, the apparatus is installed near the pipeline system to be tested. After all system pumps are turned off and the crash valve on each line is closed, the apparatus is initialized and a test pressure ramping procedure is initiated. The test pressure is maintained for at least approximately 30 minutes. If the measured leakage rate over a 30-minute period is less than a preselected rate, the pipeline system meets applicable standards. If not, all readily-accessible system fittings (connectors, adapters, O-rings, and so forth) are inspected, all defective fittings are replaced, and the system is re-tested. A second failure indicates that the measured leakage is due to a defective pipeline (or pipelines) rather than a defective fitting. The system operator may then proceed to shut down operations, and isolate and repair the leak.

15 Claims, 4 Drawing Sheets

APPARATUS AND METHOD FOR LEAKAGE TESTING OF PRESSURIZED/SUCTION PIPING SYSTEMS

BACKGROUND OF THE INVENTION

1. Field of the Invention

The present invention relates to the detection of leaks in pressurized/suction piping systems. In particular, the present invention relates to an apparatus and method for detecting leaks in pressurized/suction piping systems that carry liquid petroleum products.

2. Discussion of Background

Piping systems consisting of storage tanks and associated pipelines made of steel, fiberglass, and other materials are used to contain and dispense a wide variety of fluids. Many systems, particularly those used for storing petroleum-derived fuels (gasoline, kerosene, aviation and diesel fuel, and so forth), are installed wholly or partially underground. Others are installed above ground, or on truck beds, railroad cars, ships, barges, and other vehicles used for transporting fuels.

Leakage from such piping systems (including piping systems at gasoline service stations, manufacturing and storage facilities, and so forth) is widely recognized as being a significant source of soil and groundwater contamination, thus, constitutes one of the most important environmental problems facing the industrialized nations. Some estimates suggest that over 15% of community drinking water supplies in the United States have been contaminated from a variety of sources, including leakage from piping systems. There are several million petroleum product piping systems in the United States alone; a substantial fraction of these are known to be prone to leakage. Contamination due to leaking storage tanks and pipelines not only damages the local ecosystem, but poses serious potential health problems if contaminated groundwater is used as a source of drinking water or irrigation water, or if contaminated soil is used for growing crops. Even seemingly small leaks, if not detected expeditiously, can eventually result in the release of large amounts of product into the surrounding environment. As reliance on groundwater for drinking water, irrigation, and industrial uses increases, the problem of accurate, reliable, and efficient detection of leakage from underground tanks and piping will assume increasing urgency.

A variety of leak testing apparatus is known in the prior art, including apparatus disclosed by Maresca, Jr. et al. (U.S. Pat. No. 5,415,033), Hoffman (U.S. Pat. No. 4,918,968), McLean (U.S. Pat. No. 3,910,102), MacMurray (U.S. Pat. No. 3,756,072), and St. Clair (U.S. Pat. No. 2,353,275). However, the advent of state and federal regulations mandating periodic monitoring of piping systems that carry petroleum-based fuels has led to an increased need for simple, reliable and cost-effective leak detection apparatus.

SUMMARY OF THE INVENTION

According to its major aspects and broadly stated, the present invention encompasses an apparatus and method for leakage testing of pressurized/suction piping systems. The invention is particularly useful for leakage testing of piping systems used for liquid petroleum fuels (gasoline, kerosene, diesel and aviation fuel, etc.), including piping systems at service stations (also termed gas stations or filling stations), fuel storage depots, and the like. However, the invention may also be useful for detecting leakage of other fluids. An apparatus according to the invention includes a pump assembly for pressurizing the test system formed by the apparatus and the piping system, a pressure source connected to an input line assembly, an input line for supplying test fluid to the apparatus, an output line for discharging test fluid, and suitable adapters for connecting the input line assembly to the pipeline being tested.

In use, the apparatus is installed in an upright position near the pipeline system to be tested. After all system pumps are turned off and the crash valve on each line is closed, the apparatus is initialized and a test pressure ramping procedure (to be described in detail below) is initiated. The test pressure is maintained for a sufficient period of time to obtain a reliable measurement of the leakage rate (typically, at least approximately 30 minutes). If the measured leakage rate over this period is less than a preselected rate, the pipeline system meets applicable standards. If not, all readily-accessible system fittings (connectors, adapters, O-rings, and so forth) are inspected, all defective fittings are replaced, and the system is re-tested. A second failure indicates that the measured leakage is probably due to a defective pipeline (or pipelines) in the system. The system operator may then proceed to shut down operations, and locate and repair the leak.

An important feature of the present invention is the apparatus, which includes at least one input line assembly for conducting leak tests on a pipeline system. In a preferred embodiment of the invention, the apparatus has a plurality of such input line assemblies, thereby allowing the user to test a plurality of lines simultaneously. This feature increases test efficiency by reducing the time needed to test systems having multiple pipelines with multiple dispensers—the user can test more systems, in a shorter period of time, than is otherwise feasible.

Another feature of the present invention is the adapter used to connect the apparatus to a pipeline to be tested. The adapter has two non-intersecting bores, each providing a passage through the body of the adapter. Unlike conventional straight-through adapters, an adapter according to the present invention allows the user to obtain pressure readings on both sides of an O-ring seal. Such dual readings help the user pinpoint the location of a leak and determine whether the leak is in an easily-replaceable fitting or a less-accessible pipeline.

Still another feature of the present invention is the input line assembly. Each assembly has a test cylinder with a scale (calibrated in thousandths of a gallon, milliliters, or other suitable units) for measuring flow rates through the system during a leakage test. If desired, the cylinder may have two scales, one in U.S. units and the other in metric units.

Yet another feature of the present invention is the pump assembly, which reduces the time needed to conduct a test by priming the input line without having to prime the piping system from the test cylinder. The pump assembly also facilitates removal of test fittings by removing pressure from the test line at the conclusion of the leak testing procedure.

Another feature of the present invention is the method used for testing a pipeline system for leakage. The method is simple and flexible, with operating procedures and test pressures for both pressure-type and suction-type product dispensing systems. The user can conduct a plurality of tests simultaneously, start and stop each test independently of the other tests, and connect any input line assembly to any desired pipeline to be tested.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
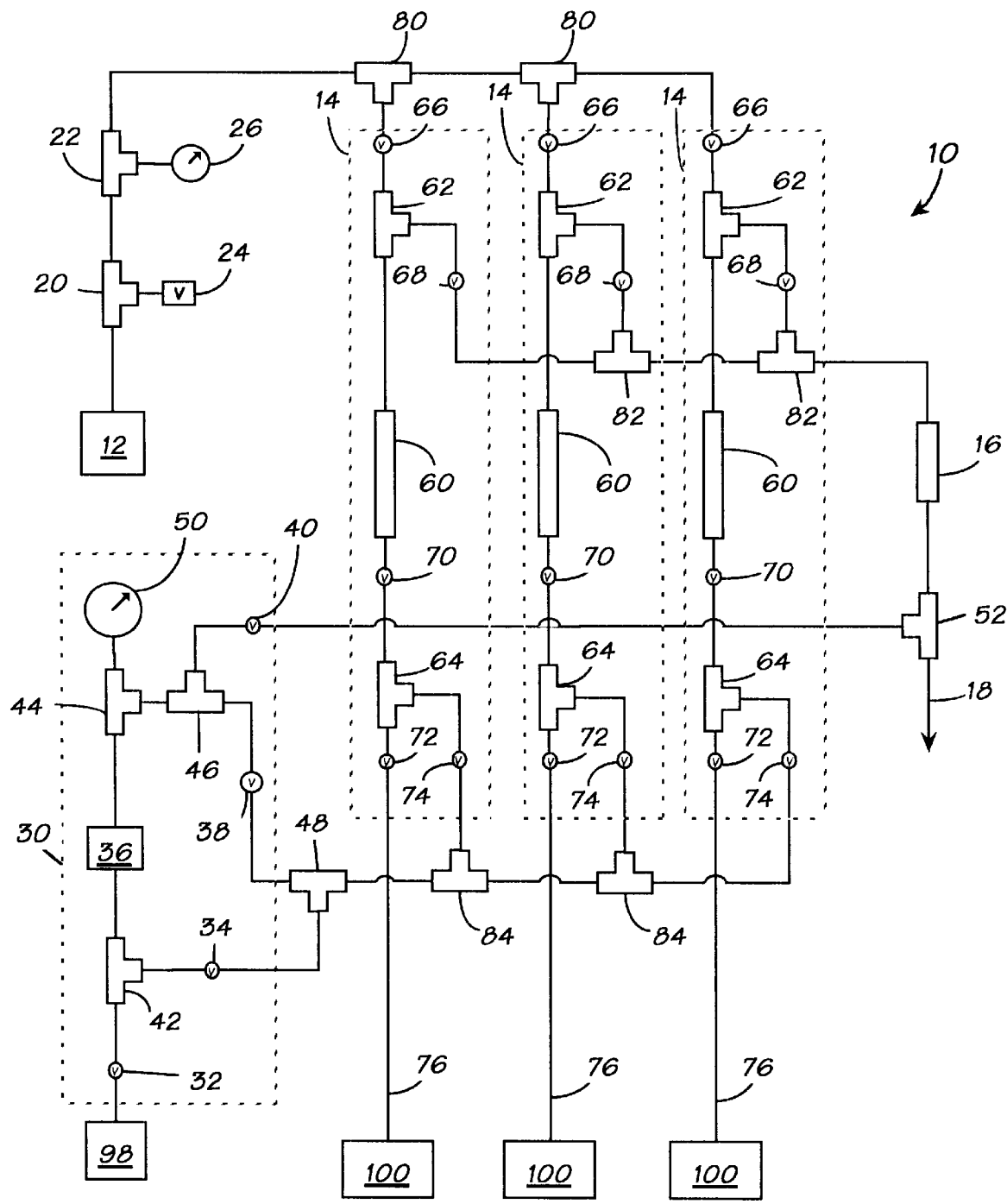
FIG. 1 is a schematic view of a leak detection apparatus according to a preferred embodiment of the present invention.

In the following description, reference numerals are used to identify structural elements, portions of elements, surfaces, and areas in the drawings. For consistency, like reference numerals identify the same structural elements, portions, or surfaces consistently throughout the several drawing figures, as such elements, portions, or surfaces may be further described or explained by the entire written specification. As used in the following description, the terms "horizontal," "vertical," "left," "right," "up," "down," as well as adjectival and adverbial derivatives thereof, refer to the relative orientation of the illustrated structure as the particular drawing figure faces the reader.

Figure 2:
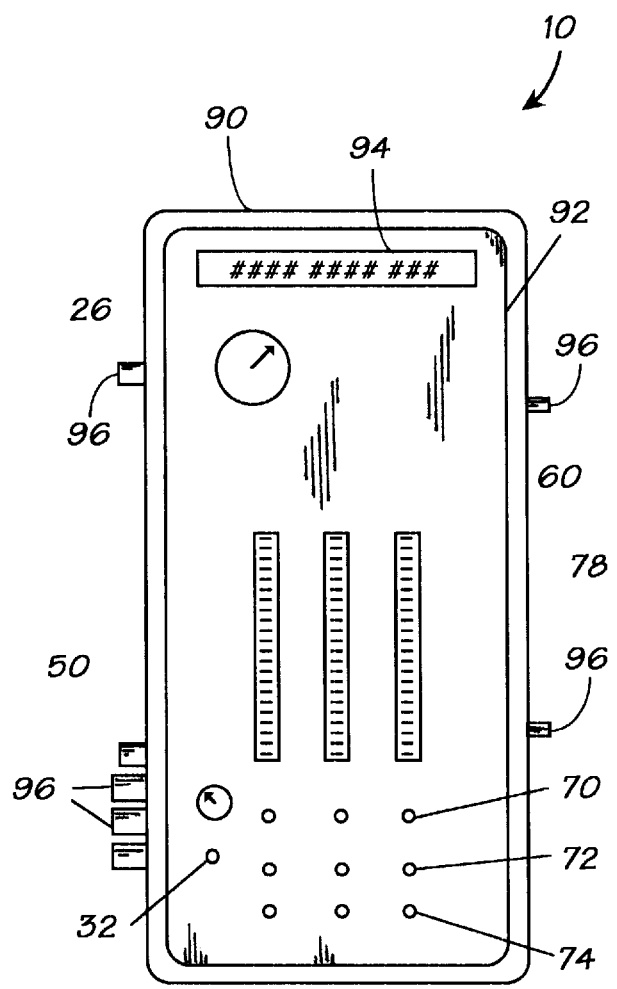
FIG. 2 is a front view of the apparatus of FIG. 1.

Referring now to FIGS. 1 and 2, there is shown a leak detection apparatus 10 according to a preferred embodiment of the present invention. Apparatus 10 includes a pressure source 12 connected to a plurality of input line assemblies 14, a check valve 16, and an output line 18 (it will be understood that the components of apparatus 10 are connected by any suitable type of conduit, such as aluminum, copper, brass, or stainless steel tubing). Apparatus 10 has at least one input line assembly 14; however, the apparatus preferably has two or more such assemblies.

Source 12 is operatively connected to input line assemblies 14 via "T"-type connectors 20, 22, which are in turn connected to a pressure relief valve 24 and a test pressure gauge 26, respectively. Source 12, a pressurized vessel that contains any suitable gas for operating apparatus 10, preferably includes a dual stage regulator. Gases that can be used with apparatus 10 include $N_2$, $CO_2$, the inert gases, and other non-oxidizable (i.e., nonflammable) gases.

A pump assembly 30 includes input valves 32, 34, a pump 36, output valves 38, 40, and "T" connectors 42, 44, 46. Pump assembly 30 is connected to the first of input line assemblies 14 via a "T" connector 48. A pump pressure gauge 50 is operatively connected to connector 44. Pressure gauges 26 and 50, as shown in FIGS. 1 or 2, and analog-type gauges; however, pressure gauges with digital readouts may be used if preferred.

Each input line assembly 14 includes a test cylinder 60, "T" connectors 62, 64, a pressure valve 66, a vent valve 68, a cylinder valve 70, a pipeline valve 72, a recharge valve 74, and a input line 76. Each cylinder 60 includes a sight glass with a scale 78 calibrated in thousandths of a gallon or other convenient units (for example, milliliters), as indicated in FIG. 2. Alternatively, cylinders 60 are provided with digital gauges that furnish a pressure readout. Preferably, cylinders 60 have sight glasses with two scales, one calibrated in thousandths of a gallon and the other in milliliters.

Assemblies 14 are linked to source 12, pump assembly 30, and an output connector 52 via a plurality of "T" connectors 80, 82, 84 (FIG. 1). As will be evident, the number of connectors 80 (and of connectors 82, 84) needed is one less than the number of assemblies 14 in apparatus 10. In operation, pump 12 is connected to an external AC (alternating current) power source; alternatively, pump 12 is operatively connected to a battery (not shown).

In one preferred embodiment of the present invention, valves 32, 34, 38, 40, 66, 68, 70, 72, 74 are ball valves; connectors 20, 22, 42, 44, etc. are shown as "T"-type connectors. However, other types of valves and fittings may also be suitable for use with the invention. By way of example, needle valves, gate valves, and multiport ball valves may also be useful.

The components of apparatus 10 are contained in a housing 90 having a front panel 92 (FIG. 2). Panel 92 carries pressure gauges 26, 50 as well as user-operable valves (valves 32, 34, 38, 40, 66, 68, 70, 72, 74) in any convenient arrangement (for clarity, only valves 32, 70, 72, 74 are shown). Panel 92 may include a plaque 94 inscribed with identifying indicia such as the manufacturer's logo, the serial number of apparatus 10, certification date of the apparatus, certification results, etc. Housing 90 also carries a plurality of fittings 96 for connecting apparatus 10 to a pressure source, a source of liquid product (gasoline, kerosene, etc.), the pipeline or pipelines to be tested, and (if needed) a power source. Apparatus 10 may be portable, or may be permanently installed in a suitable location if preferred.

For testing a pipeline system, apparatus 10 is connected to pressure source 12 and a source of liquid product 98 (FIG. 1) at the appropriate fittings 96. Input lines 76 are connected to each pipeline to be tested by adapters 100. For example, apparatus 10 is operably connected to a pressure-type or suction-type liquid petroleum product dispenser ("gas pump"), that in turn is connected to a pressurized piping system. Such dispensers typically have valves suitable for connection to a test apparatus such as apparatus 10.

Figure 3:
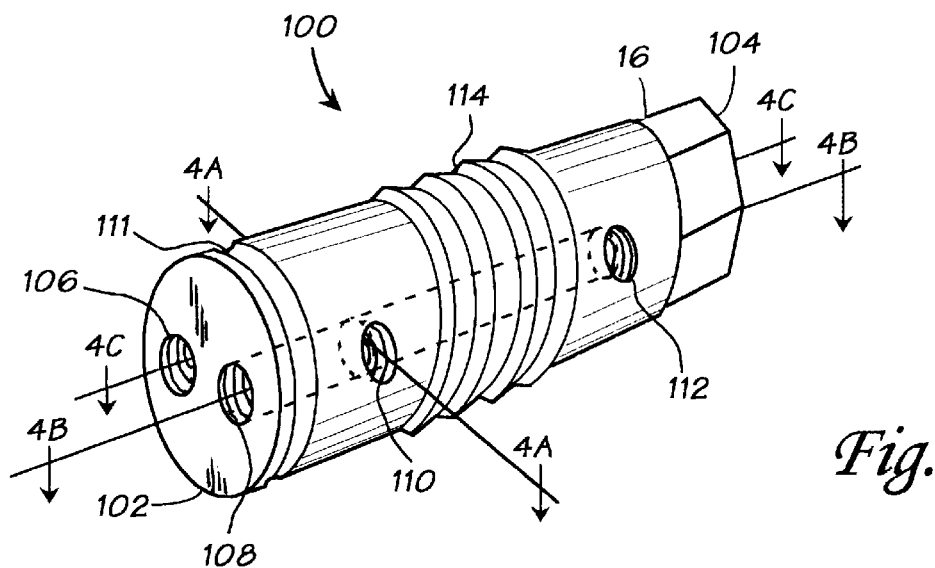
FIG. 3 is a perspective view of an adapter according to a preferred embodiment of the present invention.
Figure 4A:
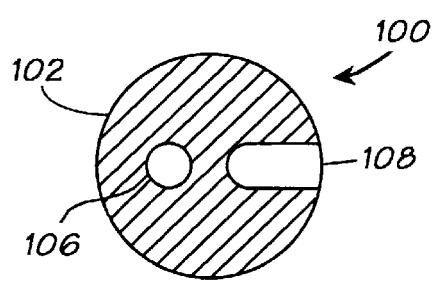
FIGS. 4A. 4B, and 4C are cross-sectional views of the adapter of FIG. 3, taken along the lines 4A—4A, 4B—4B, and 4C—4C, respectively, of FIG. 3.
Figure 4B:
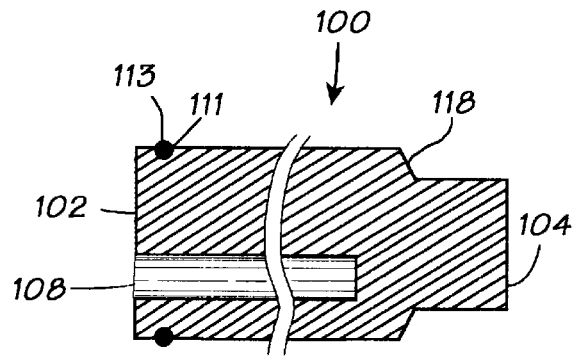
Figure 4C:
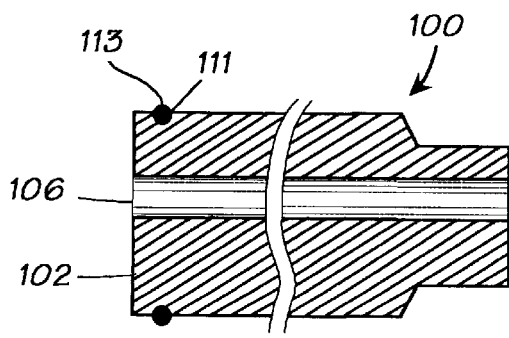

An adapter 100 according to the present invention is shown in FIG. 3 and FIGS. 4A–C. Adapter 100 has a first end 102, a second end 104, and two non-intersecting bores 106, 108. Bore 106 provides a passage through adapter 100 from end 102 to end 104 (FIG. 4C), whereas bore 108 has two openings (110, 112) along a side of the adapter. Adapter 100 also includes an O-ring groove 111 for receiving an O-ring 113. Depending on the particular design of the pipeline system with which adapter 100 is used, the adapter may have a threaded section 114, a hex-shaped section 116, or a shoulder section 118 (FIGS. 3, 4B, 4C).

Figure 5:
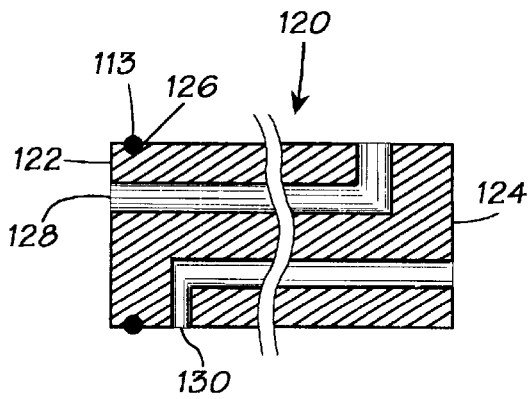
FIG. 5 is a cross-sectional view of an adapter according to another preferred embodiment of the present invention.

Another adapter according to the present invention is shown in FIG. 5. An adapter 120 has a first end 122 and a second end 124, an O-ring groove 126 for O-ring 113, and two non-intersecting bores 128, 130. Bores 128, 130 run from opposing ends 122, 124 of adapter 120, respectively, to a side of the adapter.

Unlike conventional straight-through adapters, adapters 100, 120 allow the user of apparatus 10 to obtain a pressure reading behind O-ring 113. By comparing this reading to the results of leakage testing (to be described below), the user can determine whether the measured leakage is due to the pipeline system being tested or simply to pressure build-up and resulting leakage at or behind O-ring 113. This feature eliminates a potential source of error in leakage testing. Adapters 100, 120 may be configured for connecting apparatus 10 to dispensers made by various manufacturers, including but not limited to those made by the Gilbarco, Red Jacket, Bennett, and Tokeheim companies.

The components of apparatus 10 are made of any materials that are suitable or use with the types of fluids carried by the piping systems to be tested therewith. Thus, housing 90 may be made of metal, plastic, or fiberglass; test cylinders 60 are of a durable material that is nonreactive with the types of fluids to be tested by apparatus 10 (glass, suitable plastics). All components of apparatus 10 are connected by aluminum, stainless steel, brass, or copper tubing; however, other materials that are nonreactive with the test fluid may also be used (rubber, plastic, TYGONE®, TEFLON®, and so forth). Quarter-inch gauge (about 0.65 cm) tubing is suitable for many applications; however, other gauges may also be useful. Connectors 20, 22, 100, 120, and so forth may be made of aluminum, brass, stainless steel, or suitable plastics.

Figure 6:
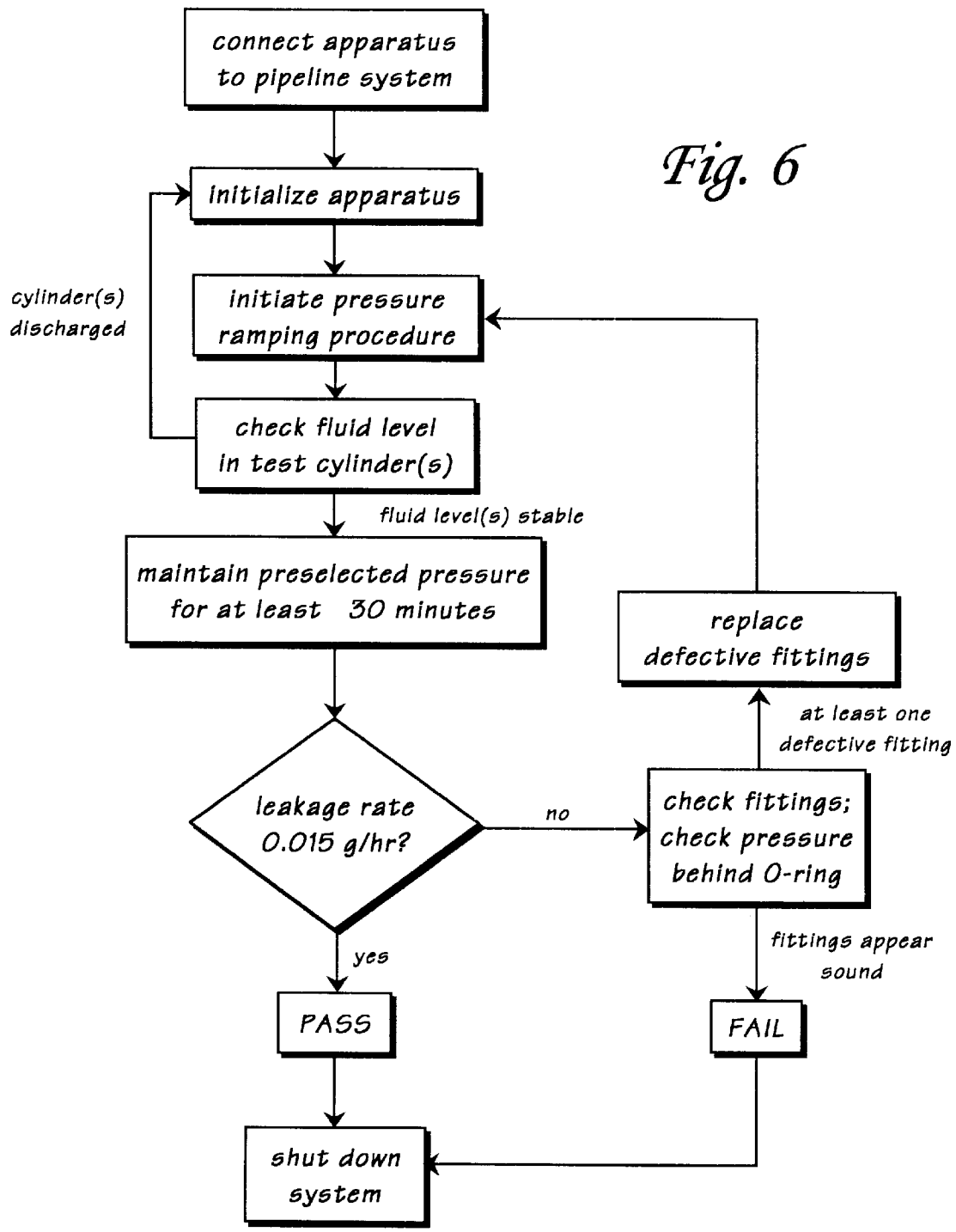
FIG. 6 is a flow chart illustrating a method for using the apparatus of FIG. 1 to detect leaks in a piping system.

Apparatus 10 is used to test typical pressure-type and suction-type product operating systems generally as follows (FIG. 6):

1. If apparatus 10 is portable, install the apparatus in an upright position near the pipeline system to be tested. Turn off all submersible and dispensing pumps in the system. Verify that the pumps are turned off by checking for vibrations, hum, etc. at the dispensers, then close the crash valve on each line.

2. For pressure-type systems, remove sufficient product until the product is level with the O-ring seal of the system, using a graduated cylinder or other suitable container. For suction-type systems, drain any remaining product from the pump housing.

3. Install the appropriate adapter 100 for each line to be tested.

4. Connect pressure source 12; check the pressure of the source. For optimum operation of apparatus 10, the source pressure does not exceed approximately 60 psi (about 414 kPa) as measured by gauge 26. Close all valves on front panel 12 (66, 68, 72, 74), and connect source 12 to assemblies 14.

5. Connect pump assembly 30 to a test fluid source 98 that contains approximately 3–4 gallons (about 11–15 l) of the product in question (gasoline, kerosene, aviation or diesel fuel, etc.); connect input lines 76 to the product dispensers to be tested via adapters 100 or standard pipe fittings.

6. Initiate pressure ramping by opening pump output valve 38. For each input line 77 in use, open the corresponding pipeline valve 72 and recharge valve 74.

7. Operate pump 36 to prime apparatus 10 and the pipeline or pipelines being tested. For pressure-type systems, operate pump 36 until pressure gauge 50 reaches a preselected level of approximately 20–30 psi (about 140–210 kPa) (8–10 psi (about 55–70 kPa) for suction-type systems). Close pump output valve 38 and pipeline valves 72.

The optimum pressure ranges for a leakage test depend on a variety of factors that will be evident to those of ordinary skill in the art, including the dimensions of the various components of apparatus 10 (tubing, sources 12 and 98, etc.), the type of fluid carried by the system, and so forth. The operating pressures listed herein are for an apparatus 10 with ¼" tubing, used for testing systems that carry liquid petroleum fuels. However, the optimum operating parameters of apparatus 10 (including the pressure ranges listed in Steps 7 and 9) are best determined by a modest amount of experimentation for each particular apparatus.

8. In sequence, open vent valves 68, pump output valve 38, recharge valves 74, and cylinder valves 70. Operate pump 36 to fill each test cylinder 60, then, in sequence, close vent valves 68, pump output valve 38, and recharge valves 74.

9. For pressure-type systems, adjust the gas pressure so that pressure gauge 26 reads approximately 44–46 psi (about 300–318 kPa), then (in sequence) slowly open pressure valves 66 and then pipeline valves 72. For suction-type systems, adjust the gas pressure to 8–10 psi (about 55–70 kPa), then slowly open pipeline valves 72.

The fluid levels in cylinders 60 vary during Steps 4–9. Check the fluid levels periodically, and repeat Steps 4–9 for any cylinder 60 that is discharged during the above-described hydraulic test pressure ramping procedure (Steps 4–9 need to be repeated only for those cylinders that are discharged). When the fluid levels in cylinders 60 stabilize, verify system integrity, then record the pressure readings and the time in use for each cylinder.

Maintain the test pressure (approximately 44–46 psi for pressure-type systems; approximately 8–10 psi for suction-type systems) for approximately 5 minutes before beginning a test; record all results in 5-minute increments. If, at any point, the test generates approximately 30 consecutive minutes of data which indicate a leakage rate lower than the test failure level, terminate the test and proceed to system shutdown (Steps 10–12). Failure levels may vary depending on the particular product at issue. For petroleum fuels such as gasoline, kerosene, etc., current United States Environmental Protection Agency (EPA) standards mandate a leakage rate lower than 0.1 gallons/hr (about 0.38 l/h). For testing purposes, however, a leakage rate no greater than approximately 0.015 gallons/hour (about 0.06 l/h) is desirable.

All pipeline systems contain fittings (connectors, adapters, O-ring seals, etc.) that may leak. Thus, not all measured leaks are due to defective pipelines; some may be caused by easily-replaceable fittings. Therefore, if the above-described test procedure indicates a leakage rate greater than 0.015 g/hr (or other applicable rate), check all readily-accessible system fittings, replace all seals, then re-test. If the measured leakage rate is still higher than 0.015 g/hr, there is probably a leak in the pipeline system itself 10. Shut down apparatus 10 by closing pressure valves 66 (if open) and pipeline valves 72. While monitoring fluid levels in cylinders 60, slowly open vent valves 68, then pipeline valves 72.

11. Measure and record the bleed back into each cylinder 60 (this parameter represents pneumatic entrapment in the pipeline being tested), then bleed or pump each line to standard pressure.

12. Disconnect input lines 76. Install suitable discharge adapters on test lines 76 and discharge the lines. If desired, open valves 34, 40 and close valves 32, 70, then open valves 72 and 74 to pump out the pipeline being tested to the maximum vacuum rating of pump 36.

The operation of apparatus 10 is further illustrated in the following nonlimiting example.

EXAMPLE

Apparatus 10 was evaluated according to a procedure specified by the United States Environmental Protection Agency (EPA) in *Standard Test Procedures for Evaluating Leak Detection Methods: Pipeline Leak Detection Systems*. EPA guidelines require that a pipeline leak detection system be capable of detecting a leak as small as 0.1 gal/h with a probability of detection ($P_D$) of 95% and a probability of false alarm ($P_{FA}$) of 5%.

A total of 80 leakage tests were conducted during a one-month period. The test system consisted of a 1.5"-diameter (about 3.8 cm), 124' (about 37.8 m) long steel pipeline containing approximately 12 gallons (about 45 l) of gasoline and a 25-gallon (about 95 l) steel tank. The temperature difference between the gasoline circulated through the pipeline for one hour or more and the average temperature of the backfill and soil between 2"–12" (about 5–40 cm) from the pipeline ranged from –25° F. to 25° F. (about –32° C. to –4° C.). Tests were conducted at a pressure of approximately 45 psi (310 kPa), with 105 ml of vapor trapped in the pipeline at a pressure of 0 psi.

Test results yielded an estimated $P_{FA}$ (0.04%) that exceeded EPA standards. The estimated $P_D$ against a leak rate of 0.1 gal/h (about 0.38 l/h) defined at a pipeline pressure of 20 psi (about 138 kPa) was 96%.

An apparatus according to the present invention provides a turnkey system with options for testing both pressure-type and suction-type pipeline systems. Apparatus 10 provides improved accuracy, reliability, safety, and convenience in pipeline leak testing, as well as saving time and labor. The apparatus can perform a plurality of pipeline tests simultaneously, thereby enabling its user to conduct more tests in a shorter period of time. Furthermore, valves 66, 68, 70, 72, 74 allow the user to operate each of the assemblies 14 independently of the other assemblies 14, thus, he can test one piping system or a plurality of systems as needed.

Apparatus 10 is especially suited for testing pipeline systems that are associated with underground storage tank facilities that contain petroleum-based fuels or other chemicals, including underground lines between service station storage tanks and the pumps or dispensers located on the station "islands." Apparatus 10 as described above is configured for use with underground or aboveground pipeline systems having 2"-diameter (about 5.1 cm) or smaller-diameter piping, that are no more than approximately 200' (about 61 m) in overall length; however, apparatus 10 may readily be adapted for use with systems having dimensions outside these ranges.

It will be apparent to those skilled in the art that many changes and substitutions can be made to the preferred embodiment herein described without departing from the spirit and scope of the present invention as defined by the appended claims.

What is claimed is:

1. An apparatus for detecting leaks in a pressurized fluid piping system, said apparatus comprising:
   at least one test cylinder for receiving a quantity of a test fluid;
   means for transferring said test fluid to said cylinder, said fluid-transferring means being selectively operable to pump test fluid into said cylinder;
   means for measuring a fluid pressure in said fluid-transferring means;
   means for pressurizing fluid contained in said cylinder to a preselected pressure;
   means for measuring a gas pressure in said cylinder;
   means for connecting said cylinder to a pipeline to be tested, said connecting means including an adapter having formed therein a first bore, and a second bore, said first and second bores being nonintersecting;
   means for selectively pressurizing said pipeline;
   means for detecting any loss of fluid from said cylinder after pressurization of said pipeline; and
   output means for discharging said test fluid from said cylinder.

2. The apparatus as recited in claim 1, wherein at least a portion of said cylinder is substantially transparent, and wherein said detecting means further comprises a graduated scale attached to said cylinder.

3. The apparatus as recited in claim 1, wherein said transferring means further comprises a pump operatively connected to said cylinder.

4. The apparatus as recited in claim 1, wherein said fluid pressurizing means further comprises means for connecting said cylinder to a reservoir containing pressurized gas.

5. The apparatus as recited in claim 1, wherein said fluid pressure-measuring means further comprises a pressure gauge operatively connected to said cylinder.

6. The apparatus as recited in claim 1, wherein said fluid pressure-measuring means further comprises a pressure gauge operatively connected to said fluid-transferring means.

7. The apparatus as recited in claim 1, wherein said pipeline-pressurizing means further comprises at least one valve operatively connected to said cylinder.

8. The apparatus as recited in claim 1, wherein said at least one cylinder further comprises at least two cylinders, each of said cylinders being operable independently of the other cylinder for testing a different pipeline.

9. A method for detecting leaks in a pressurized fluid piping system, said method comprising the steps of:
   connecting a pipeline of said piping system to a test cylinder, said cylinder adapted for receiving a test fluid;
   transferring a preselected quantity of said test fluid to said cylinder so that said cylinder contains a volume of said test fluid;
   pressurizing said pipeline to a first preselected pressure;
   pressurizing said test fluid in said cylinder to a second preselected pressure;
   monitoring said volume while maintaining said first preselected pressure in said pipeline for a period of time, said piping system being considered substantially leak-free if said volume remains substantially constant during said period.

10. The method as recited in claim 9, wherein said pressurizing step further comprises ramping a pressure in said cylinder to said first preselected pressure.

11. The method as recited in claim 9, wherein said piping system is a pressure-type system for use with liquid petroleum fluids, and wherein said second preselected pressure is approximately 44–46 psi.

12. The method as recited in claim 9, wherein said piping system is a suction-type system for use with liquid petroleum fuels, and wherein said second preselected pressure is approximately 8–10 psi.

13. The method as recited in claim 9, wherein said monitoring step further comprises maintaining said second pressure for at least approximately 30 minutes.

14. The method as recited in claim 9, wherein said monitoring step further comprises measuring a change in said volume, and wherein said piping system is considered substantially leak-free if said volume decreases at a rate no greater than a preselected rate.

15. The method as recited in claim 9, wherein said monitoring step further comprises measuring a change in said volume, and wherein said piping system is considered leak-prone if said volume decreases at a rate greater than a preselected rate.

* * * * *